United States Patent [19]
Lee et al.

[11] Patent Number: 5,481,450
[45] Date of Patent: Jan. 2, 1996

[54] SWITCHING POWER SUPPLY SYSTEM FOR PRIMARY AND SECONDARY LOADS WITH LESS SWITCHING LOSS

[75] Inventors: Myung-Jun Lee, Seoul, Rep. of Korea; Mitsuo Ueki, Kawagoe, Japan

[73] Assignee: Sanken Electric Co., Ltd., Saitama, Japan

[21] Appl. No.: 233,136

[22] Filed: Apr. 26, 1994

[30] Foreign Application Priority Data

Apr. 27, 1993 [JP] Japan .................................. 5-27814 U

[51] Int. Cl.⁶ .......................... H02M 3/335; H04N 5/63; H02J 3/00
[52] U.S. Cl. ............................. 363/21; 363/97; 348/730; 348/734; 307/17; 307/38
[58] Field of Search .................................. 363/15, 16, 20, 363/21, 95, 97, 131; 323/282, 285; 348/730, 734; 315/411; 307/17, 30, 38, 39

[56] References Cited

U.S. PATENT DOCUMENTS

| | | | |
|---|---|---|---|
| 3,742,242 | 6/1973 | Morio et al. | 307/17 |
| 4,386,371 | 5/1983 | George | 348/734 |
| 4,642,744 | 2/1987 | Thomas | 363/21 |
| 4,651,214 | 3/1987 | Rodriguez-Cavazos | 348/730 |
| 4,968,106 | 11/1990 | Ikeuchi et al. | 348/730 |
| 4,975,592 | 12/1990 | Hahn et al. | 307/38 |
| 5,349,515 | 9/1994 | Megeid | 363/21 |
| 5,351,177 | 9/1994 | Megeid | 363/21 |
| 5,402,330 | 3/1995 | Megeid | 363/21 |

FOREIGN PATENT DOCUMENTS 4-308465  10/1992  Japan .

*Primary Examiner*—Matthew V. Nguyen
*Attorney, Agent, or Firm*—Woodcock Washburn Kurtz Mackiewicz & Norris

[57] ABSTRACT

A power supply system to be built into a television receiver, for powering both the main electric circuitry of the TV set and a remote control receiver circuit. The power supply system comprises a transformer having a primary winding coupled to a direct current power supply via a switching transistor, and secondary windings coupled to the main TV circuitry and to the remote control receiver circuit via rectifying and smoothing circuits. Duration modulated pulses for on-off control of the switching transistor are reduced in recurrence rate when the main TV circuitry is not being powered, so that the remote control receiver circuit is powered with less switching loss than if the switching frequency is left the same as when the main TV circuitry is being powered.

11 Claims, 5 Drawing Sheets

SWITCHING POWER SUPPLY SYSTEM FOR PRIMARY AND SECONDARY LOADS WITH LESS SWITCHING LOSS

BACKGROUND OF THE INVENTION

This invention relates to power supply systems, and more specifically to those of the switching type for powering both a primary and a secondary load, the secondary load being significantly less in power requirement than the first. The switching power supply system according to the invention is particularly well suited for use in or with remotely controllable television receivers, among other applications.

A greater majority of television sets today are remotely controllable. Such TV sets have an inbuilt remote control receiver circuit for receiving signals from the remote control unit. The remote control receiver circuit must be powered even when the main electric circuitry of the TV set is not. The power supply systems of remotely controllable TV sets are therefore required to possess a circuit for powering the main circuitry (primary load) and another for powering the remote control receiver circuit (secondary load). The provision of two totally independent power supply circuits would be undesirable, however, because the resulting system would be too bulky and costly.

A solution to this problem is found for example in Japanese Unexamined Patent Publication No. 4-308465, in which the two power supply circuits are combined so as to share some components. More specifically, this prior art power supply system comprises a switching transistor for on-off control of a unidirectional supply voltage, and a transformer having a primary winding connected in series with the switching element, a secondary winding for powering the main TV set circuitry, and a tertiary winding for powering the remote control receiver circuit. The switching transistor is controlled so as to make constant the supply voltage applied to the main TV set circuitry.

Customarily, the switching frequency of such TV set power supply systems has been as high as from 40 to 100 kilohertz, with a view to the reduction of the size of the transformer and the suppression of noise in the audio frequency range. However, the constant switching of the direct current power supply at such high frequencies inevitably involves considerable power losses. The trouble with the prior art switching power supply system is that such high switching frequencies have been maintained not only when the main TV set circuitry is being powered but also when it is not, that is, when only the remote control receiver circuit is. Naturally, TV sets are held switched on for a much shorter period of time than off.

SUMMARY OF THE INVENTION

The present invention seeks to enhance the efficiency of switching power supply systems of the kind defined, particularly when only the secondary load is being powered.

Briefly, the invention may be summarized as a switching power supply system for a primary and a secondary load, the primary load being greater in power requirement than the secondary load. The system comprises a transformer having a primary winding connected across a direct current power supply via a switching element, and secondary winding means having first output means for providing a first supply voltage, and second output means for providing a second supply voltage, the first supply voltage being greater than the second supply voltage. The first output means of the transformer secondary means is connected to a first rectifying and smoothing circuit, to which the primary load is intended to be connected, whereas the second output means of the transformer secondary means is connected to a second rectifying and smoothing circuit, to which the secondary load is to be connected. Also included are load state signal means for providing a load state signal indicative of whether the primary load is being powered or unpowered while the secondary load is held powered, and pulse generator means connected between the switching element and the load state signal means for generating a train of pulses at a first recurrence rate for opening and closing the switching element when the primary load is being powered, and at a second recurrence rate, less than the first recurrence rate, for opening and closing the switching element when the primary load is not being powered.

Thus, when the primary load is not being powered, the secondary load can be powered with less switching loss than if the switching element is opened and closed with the same frequency as when the primary load is being powered.

As an additional advantage, the reduction of the switching frequency during the powering of only the secondary load makes it possible to make longer the durations of the switching pulses than if, as has been the case heretofore, their recurrence rate is held the same as when the primary load is being powered. Such longer duration pulses are more stable and positive than the conventional very short duration pulses that have been required for powering the secondary load of very small power requirement.

The transformer in use may be reduced in size to an extent necessary for powering the primary load at the relatively high first switching frequency. The reduction of this switching frequency to the second is when the primary load is not powered will present no inconvenience at all because, at least in the typical intended application of the invention, the power consumption of the secondary load is sufficiently small for such a small transformer being switched at the reduced frequency.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
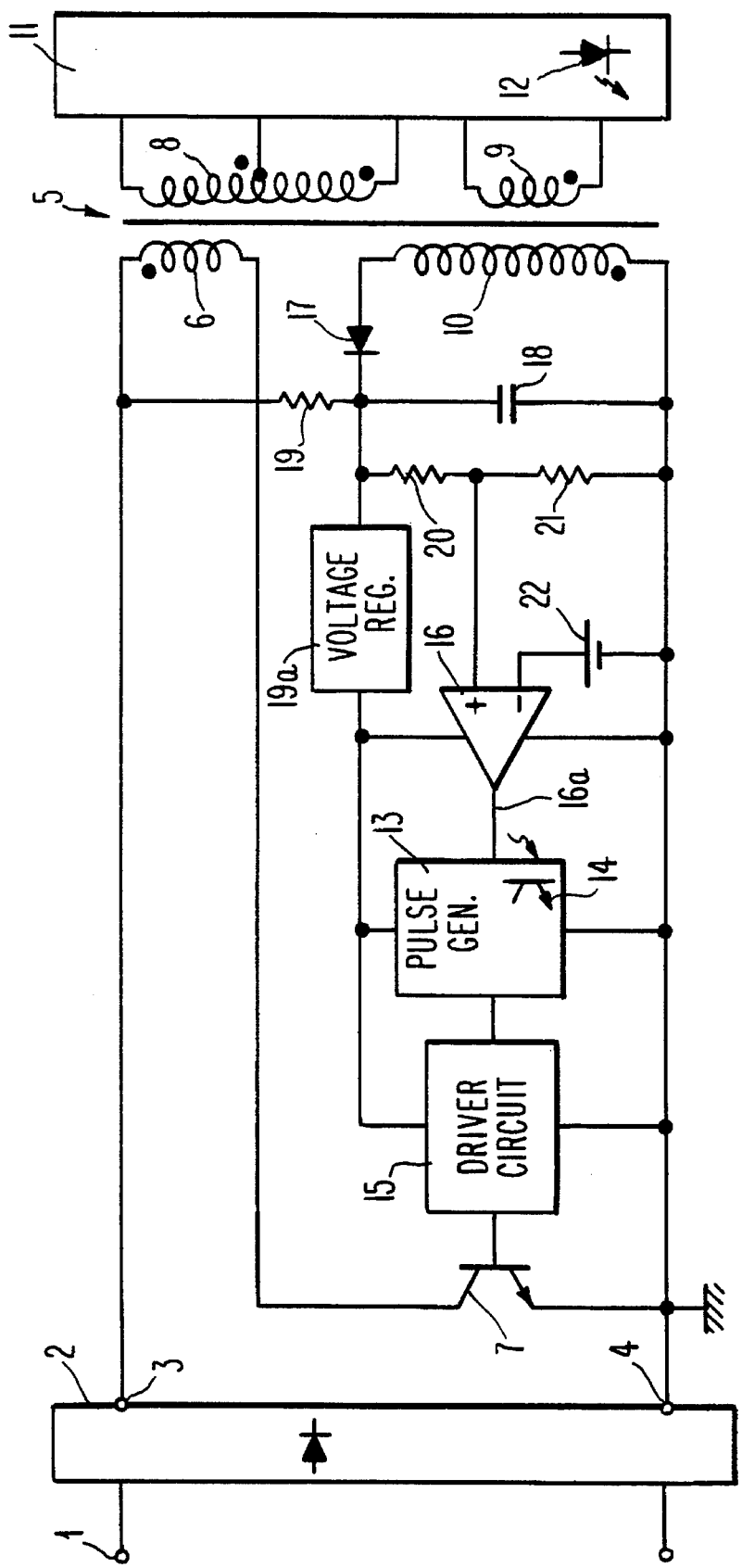
FIG. 1 is a schematic electrical diagram, partly in block diagrammatic form, of a typical switching power supply system configured according to the novel concepts of this invention.

The invention will now be described in detail as embodied in the switching power supply system shown in FIGS. 1–8 as adapted for use in or with a remotely controllable television set. With reference first to FIG. 1 a pair of commercial alternating current supply terminals 1 are shown coupled to a direct current power supply 2 of any known or suitable construction having rectifying and smoothing circuit means. Connected between the pair of output terminals of the power supply 2, that is, a direct current power supply 8 and a ground terminal 4, is a serial circuit of a primary winding 6 of a transformer 5 and a switching element herein shown as a transistor 7. The transformer 5 is shown to additionally comprise a secondary winding 8, a tertiary winding 9 and a quaternary winding 10.

The transformer secondary 8 and tertiary 9 are both coupled to an output circuit 11 for powering a primary and a secondary load according to the invention. The primary load in this case is the main electric circuitry of the TV set, and the secondary load a remote control receiver circuit built into the TV set. It is therefore understood that the secondary load is to be constantly held powered whereas the primary load is to be switched on and off at the will of the user. The output circuit 11 is shown in detail in FIG. 2, to which reference will be had presently. Suffice it to say for the moment that the output circuit 11 includes a light emitting diode (LED) 12 which gives off light with an intensity depending upon the magnitude of the voltage being applied to the primary load, for constant voltage control of the primary load.

For on-off control of the switching transistor 7 there is provided a duration-modulated pulse generator circuit 13 which is connected to the base of the switching transistor via a driver circuit 15. The pulse generator circuit 13 includes a phototransistor 14 which is optically coupled to the LED 12 of the output circuit 11 for constant voltage control of the primary load. The pulse generator circuit 13 will be later described in detail with reference to FIG. 8.

Coupled to an input of the pulse generator circuit 13, a comparator 16 functions to detect whether only the secondary load, or both primary and secondary loads, are being powered, and to vary the recurrence rate of the output pulses of the pulse generator circuit accordingly. This power supply system is so constructed that when only the secondary load is being powered, the voltage across the transformer secondary 8 drops to one fifth of that when both primary and secondary loads are powered. It is therefore possible for the comparator 16 to determine from such a change in transformer output voltage whether only the secondary load or both primary and secondary loads are being powered.

The transformer quaternary 10 serves to power the pulse generator circuit 13, switch driver circuit 15 and comparator circuit 16. A capacitor 18 is connected across the transformer quaternary 10 via a diode 17, and its output is coupled via a voltage regulator circuit 19a to the supply terminals of the pulse generator circuit 15, switch driver circuit 15 and comparator 16. The number of turns of the transformer quaternary 10 should be so determined that the voltage regulator circuit 19a can provide an output voltage of required magnitude even when the quaternary output voltage is at its lowest level. A starting resistor 19 is connected between the supply terminal 3 and the capacitor 18.

Connected in parallel with the capacitor 18 is a serial connection of two voltage dividing resistors 20 and 21. The connection between these resistors is coupled to one input of the comparator 16, the other input of which is coupled to a constant voltage source herein shown as a Zener diode 22. It is understood that the transformer quaternary 10 is so polarized that the diode 17 conducts during the nonconducting periods of the switching transistor 7, and that the output circuit 11 is so designed that the transformer quaternary 10 provides a voltage proportionate with the transformer secondary voltage during such periods. Thus the comparator 16 can provide the desired output indicative of the magnitude of the transformer secondary voltage and, in consequence, of whether both primary and secondary loads or only the secondary load is being powered. The recurrence rate of the output pulses of the pulse generator circuit 13 is to change in response to the output signal of the comparator 16.

Figure 2:
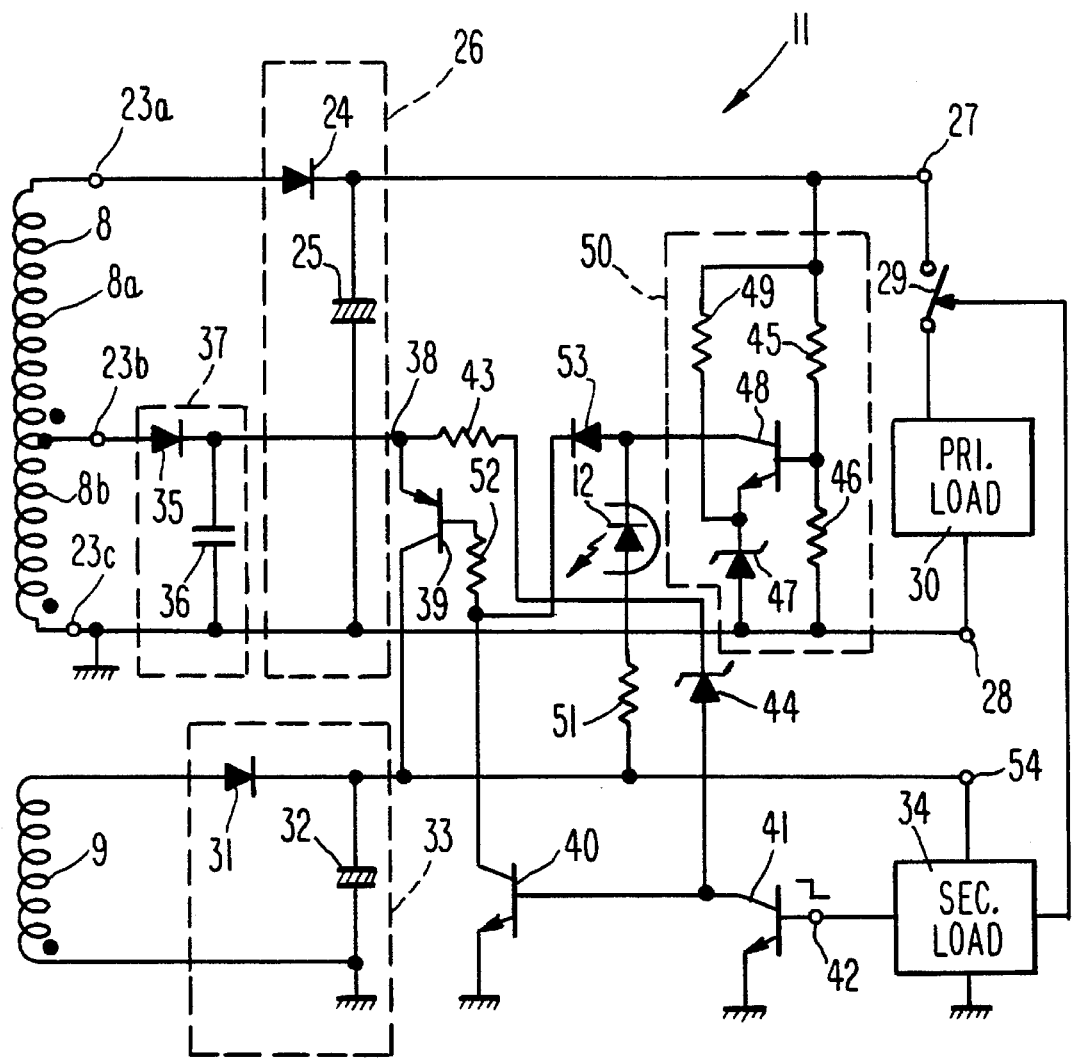
FIG. 2 is a schematic electrical diagram of the transformer output circuit in the FIG. 1 power supply system.

Reference may now be had to FIG. 2 for a closer study of the output circuit 11. The transformer secondary 8 is shown tapped and thereby divided into two divisions 8a and 8b, although two separate windings could be provided instead of one such tapped winding. The tapped transformer secondary 8 has a first terminal 23a for providing a relatively high voltage of, say, 112 volts, a second terminal 23b for providing a lower voltage of, say, 60 volts, and a ground terminal 23c The first terminal 23a of the transformer secondary 8 is coupled to an output terminal 27 via a first rectifying and smoothing circuit 26 comprising a rectifying diode 24 and smoothing capacitor 25. The ground terminal 23c of the transformer secondary 8 is connected to another output terminal 28. Connected between the pair of output terminals 27 28 is the primary load 30 which in this embodiment is understood to be the main electric circuitry of the television set. The power requirement of the primary load 30 may be approximately 90 watts. An internal power switch 29 of the TV set is connected between output terminal 27 and primary load 30.

Less in the number of turns than the transformer secondary 8, the transformer tertiary 9 is intended to power a secondary load which takes the form of a television remote control receiver circuit 34 in this embodiment. One extremity of the transformer tertiary 9 is coupled to the remote control receiver circuit 34 via a second rectifying and smoothing circuit 33, and the other extremity of the transformer tertiary grounded. The second rectifying and smoothing circuit 33 comprises a diode 31 and a capacitor 32. The power requirement of the secondary load 34 is significantly less than that of the primary load 30, being one watt or so in the illustrated embodiment.

The noted remote control receiver circuit 34 is itself of conventional design capable of controlling various operations of the TV set in response to signals transmitted from a remote control unit, not shown, for that TV set. It is among the standard functions of the receiver circuit 34 to make on-off control of the TV set power switch 29. In connection with this particular function, the receiver circuit 34 is equipped to put out what may be termed a primary load state signal on a terminal 42 which, just like the output from the FIG. 1 comparator 16, indicates whether the TV set circuitry is powered or unpowered. The primary load state signal is high when the TV set circuitry is powered, that is, when the power switch 29 is closed, and low when the TV set circuitry is not powered.

For powering the remote control receiver circuit 34 when the TV set circuitry is unpowered, the second terminal 23b of the transformer a secondary 8 is connected to a third rectifying and smoothing circuit 37 comprising a diode 35 and a capacitor 36. The output line 38 of this circuit 37 is coupled to the remote control receiver circuit 34 via a switching transistor 39 of pnp type. Another transistor 40 of npn type is connected between the base of the transistor 39 and the ground for operating this transistor 39 only when the TV set circuitry is unpowered. The transistor 40 has its base coupled to still another transistor 41 and thence to the terminal 42 of the remote control receiver circuit 34. There are connected between the output line 38 of the rectifying and smoothing circuit 37 and the base of the transistor 40 a resistor 43 for a adjustment of the supply voltage applied to the remote control receiver circuit 34 and a Zener diode 44 for voltage stabilization.

The primary load state signal from the terminal 42 is high as aforesaid when the primary load 30 is powered, and low when it is not. Consequently, during the operation of the primary load 30, the transistor 41 is conductive whereas the transistors 39 and 40 are not, so that the third rectifying and smoothing circuit 37 is disconnected from the remote control receiver circuit 34. Then, however, the remote control receiver circuit 34 can be powered from the second rectifying and smoothing circuit 33.

The reference numeral 50 generally denotes a voltage control signal forming circuit for controlling the phototransistor 14, FIG. 1, of the duration modulated pulse generator circuit 13 according to the voltage between the pair of output terminals 27 and 28. The output of the circuit 50 is connected to the LED 12 which has been set forth with reference to FIG. 1.

The voltage control signal forming circuit 50 comprises two output voltage detecting resistors 45 and 46 connected in series with each other between the pair of output terminals 27 and 28. The connection between these resistors 45 and 46 is coupled to the base of an amplifying transistor 48. Connected between the output terminals 27 and 28 via another resistor 49, a Zener diode 47 applies a reference voltage to the emitter of the transistor 48. The collector voltage of the amplifying transistor 48 decreases with an increase in output voltage in the illustrated embodiment.

The collector of the amplifying transistor 48, or the output of the voltage control signal forming circuit 50, is coupled as aforesaid to the cathode of the LED 12 which is optically coupled to the phototransistor 14. The anode of the LED 12 is coupled to the output of the rectifying and smoothing circuit 33 via a current limiting resistor 51.

The transistor 40, which functions to decrease the supply voltage the pair of output terminals 27 and 28 when the TV set circuitry is unpowered, has its collector coupled to the switching transistor 39 via a resistor 52 on one hand and, on the other hand, to the cathode of the LED 12 via a diode 53. The emitter of the transistor 40 is grounded.

Figure 3:
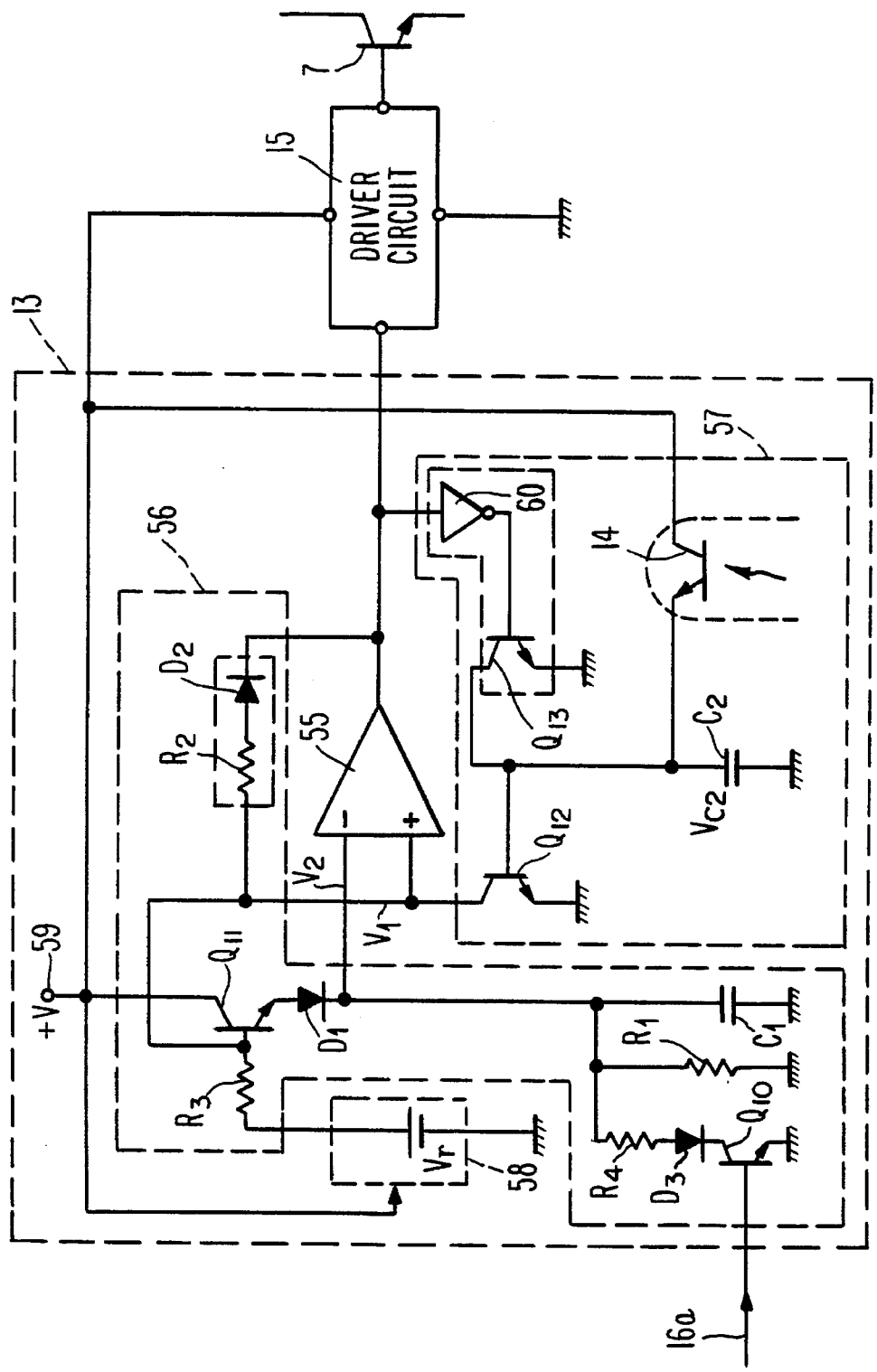
FIG. 3 is a schematic electrical diagram of the duration modulated pulse generator circuit in the FIG. 1 power supply system.

As diagramed in detail in FIG. 3, the duration modulated pulse generator circuit 13 of FIG. 1 broadly comprises a voltage comparator 55, an interpulse space control circuit 56, a pulse duration control circuit 57, and a reference voltage source 58, for generating duration modulated pulses to be applied to the switch driver circuit 15.

More specifically, the interpulse space control circuit 56 comprises a capacitor $C_1$, four resistors $R_1$–$R_4$, two transistors $Q_{10}$ and $Q_{11}$, and three diodes $D_1$–$D_3$. The capacitor $C_1$ is connected between a supply terminal 59 and the ground via the transistor $Q_{11}$ and diode $D_1$. The resistor $R_1$ is connected in parallel with the capacitor $C_1$ to provide a discharge circuit. The transistor $Q_{10}$ is also connected in parallel with the capacitor $C_1$ via the resistor $R_4$ in order to switch the time of discharge.

The capacitor $C_1$ is also coupled to the negative input of the comparator 55, the positive input of which is coupled to the reference voltage source 58 via the resistor $R_3$, and the output of which is coupled to the switch driver circuit 15. The transistor $Q_{11}$ has its base coupled to the reference voltage source 58 via the resistor $R_3$ on one hand and, on the other hand, to the output of the comparator 55 via a serial connection of the resistor $R_2$ and diode $D_2$. This serial circuit functions to make the transistor $Q_{11}$ nonconductive when the comparator 55 goes low, thereby terminating the charging of the capacitor $C_1$.

The pulse duration control circuit 57 comprises a capacitor $C_2$, two transistors $Q_{12}$ and $Q_{13}$, a NOT circuit 60, and the noted phototransistor 14. The capacitor $C_2$ has one terminal coupled to the supply terminal 59 via the phototransistor 14, and another terminal grounded. Said one terminal of the capacitor $C_2$ is additionally coupled to the base of the transistor $Q_{12}$ which is connected between the positive input of the comparator 55 and the ground. Connected in parallel with the capacitor $C_2$, the transistor $Q_{13}$ has its base coupled to the output of the comparator 55 via the NOT circuit 60.

In the operation of the FIG. 3 duration modulated pulse generator circuit 13, the reference voltage Vr of, say, 6.3 volts will be applied from its source 58 to the positive input of the comparator 55. The reference voltage will also cause conduction through the transistor $Q_{11}$ of the interpulse space control circuit 56. Consequently, the capacitor $C_1$ will be charged by the voltage +V from the supply terminal 59, to an extent corresponding to the value (e.g. five volts) obtained by subtracting the sum of the base to emitter voltage $V_{BE}$ of the transistor $Q_{11}$ and the voltage Vf of the diode $D_1$ from the reference voltage Vr. The capacitor $C_1$ will be charged rapidly to that value because no resistor is included in its charging circuit. The charging voltage is also applied to the negative input of the comparator 55.

FIG. 4(A) indicates by the solid line the waveform of the voltage $V_1$ to the positive input of the comparator 55 and by the broken line the sawtooth waveform of the voltage $V_2$ to the negative input of the comparator. Since the input voltage $V_1$ has a maximum amplitude of 6.3 volts, and the input voltage $V_2$ that of 5.0 volts, in this embodiment, the comparator 55 will be high when the capacitor $C_1$ is fully charged. No error in operation will take place due to noise because the difference between the two input voltages is 1.3 volts.

The CR time constant determined by the capacitance of the capacitor $C_2$ of the pulse duration control circuit 57 and the resistance of the phototransistor 14 is set higher than that determined by the capacitance of the capacitor $C_1$ and the resistance of its charging circuit, so much so that, as indicated in FIG. 4(B), the voltage $Vc_2$ of the capacitor $C_2$ will rise gradually during the $t_0$–$t_1$ conducting period Ton of the switching transistor 7. During the conducting period Ton the comparator 55 is high, as in FIG. 4(C). The NOT circuit 60 is therefore low, holding the transistor $Q_{13}$ nonconductive, so that no discharge circuit is formed for the capacitor $C_2$.

The transistor $Q_{12}$ will become nonconductive when the voltage $Vc_2$ of the capacitor $C_2$ rises to 0.7 or 0.8 volt. The reference voltage $V_1$ to the positive input of the comparator 55 will then drop and become less than the voltage $V_2$ to the negative input of the comparator, with s the result that the comparator will go low at time $t_1$, as in FIG. 4(C). Thereupon the diode $D_2$ will become conductive. Thus, during the nonconducting period Toff of the switching transistor 7, as from time $t_1$ to time $t_2$ in FIG. 4, the voltage $V_1$ to the positive input of the comparator 55 will be fixed at approximately three volts according to the equation $$V_1=\{(Vr-Vf)R_2/(R_2+R_3)\}+Vf$$

where Vf stands for the forward voltage of each of the diodes $D_1$ and $D_2$.

Also, when the comparator 55 goes low as at the time $t_1$, the NOT circuit 60 will go high thereby causing conduction through the transistor $Q_{13}$. Consequently, the capacitor $C_2$ will discharge rapidly as in FIG. 4(B).

Since the voltage $V_1$ to the positive input of the comparator 55 is less than the voltage V2 to its negative input during the $t_1$–$t_2$ nonconducting period Toff of the switching transistor 7, the transistor $Q_{11}$ and diode $D_1$ will be reverse biased and so nonconductive. The capacitor $C_1$ will therefore be not charged; instead, this capacitor will discharge through both resistors $R_1$ and $R_4$ when the primary load 30 is being powered, causing a gradual decrease in the voltage $V_2$ to the negative input of the comparator 55, as in FIG. 4(A). It is thus seen that during each nonconducting period of the switching transistor 7, the voltage $V_1$ to the positive input of the comparator 55 remains the same whereas the voltage $V_2$ to its negative input drops at a constant rate until it becomes the same in magnitude as the voltage $V_1$ at the time $t_2$. The duration of each nonconducting period Toff is therefore constant.

If the primary load 30 is not powered, on the other hand, the capacitor $C_1$ will discharge at a reduced rate only through the resistor $R_1$ when the transistor $Q_{10}$ is nonconductive. The voltage $V_2$ to the negative input of the comparator 55 will then drop at a correspondingly reduced rate. Each nonconducting period Toff will therefore be longer than that when the primary load is being powered, resulting in a decrease in the switching frequency of the transistor 7.

Figure 4:
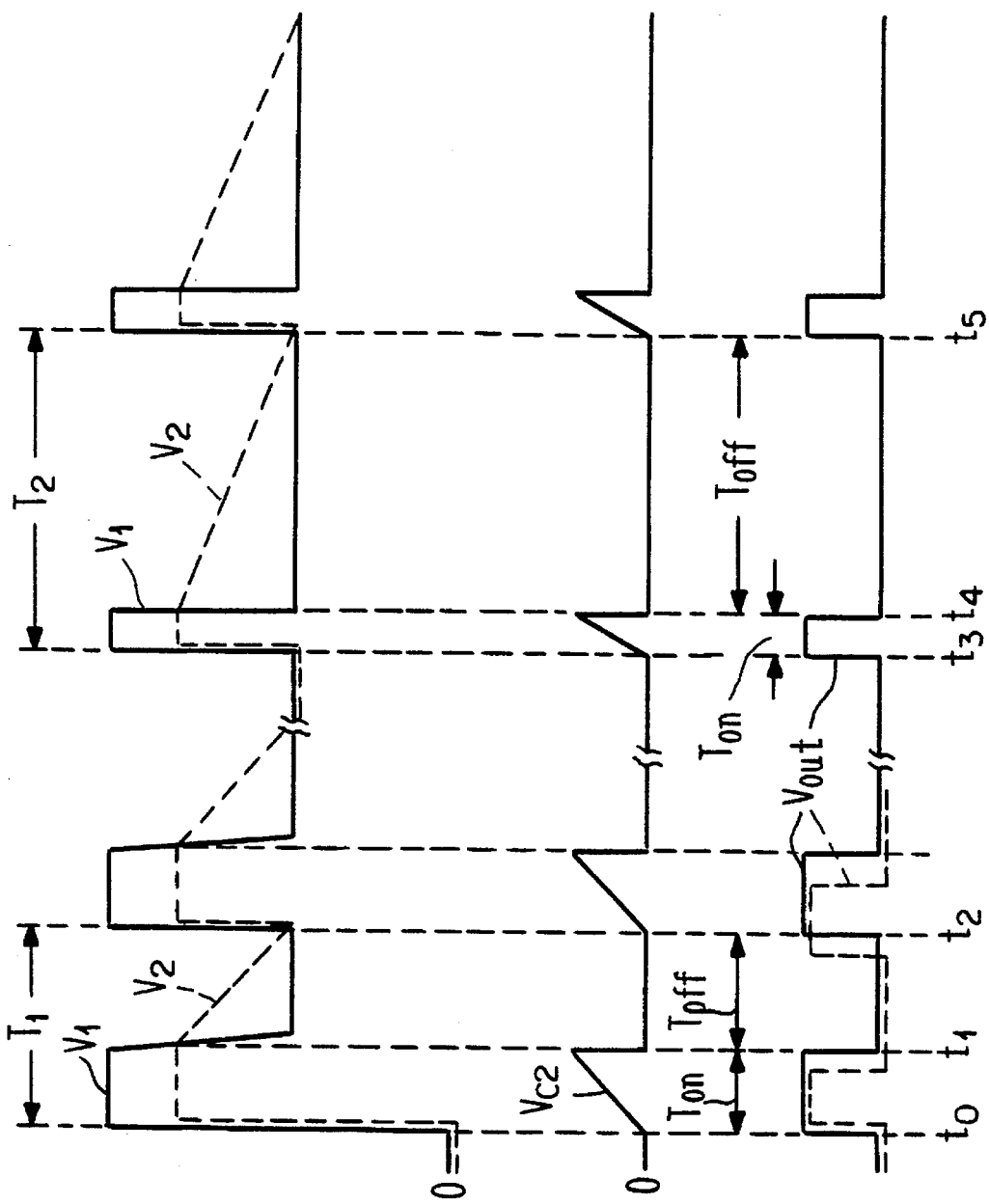
FIG. 4(A) is a waveform diagram explanatory of the operation of the FIG. 3 pulse generator circuit.
FIG. 4(B) is a waveform diagram explanatory of the operation of the FIG. 3 pulse generator circuit.
FIG. 4(C) is a waveform diagram explanatory of the operation of the FIG. 3 pulse generator circuit.

The comparator 55 will go high when the input voltage $V_2$ becomes less than the other input voltage $V_1$, as at time $t_2$ in FIG. 4. The procedure of the $t_0$–$t_2$ period will be repeated thereafter. The FIG. 4(C) output Vout of the comparator 55, or of the duration modulated pulse generator circuit 13, is applied to the switch driver circuit 15, thereby causing the same to switch the transistor 7 accordingly.

The phototransistor 14 will decrease in resistance, and the charging current of the capacitor $C_2$ will increase, if the voltage between the pair of output terminals 27 and 30 exceeds the desired value of 112 volts. As the capacitor $C_2$ will then be charged at a higher rate, the transistor $Q_{12}$ will become conductive in a shorter period of time from the moment the comparator 55 goes high. Then the durations Ton of the output pulses of the comparator 55, or of the pulse generator circuit 13, will become shorter, as indicated by the broken line in FIG. 4(C). The interpulse space Toff will nevertheless remain the same, so that the supply voltage will return to the desired value through the decrease in the duty ratio of the pulse generator output pulses.

The operation of the FIG. 3 pulse generator circuit 13 having been set forth, that of the FIGS. 1 and 2 power supply system will now be described. The primary load state signal on the remote control receiver circuit output terminal 42, FIG. 2, is high when the primary load 30 is being powered with the power switch 29 closed. The transistors 39 and 40 and diode 53 are then nonconductive. The LED 12 will therefore emit light with an intensity in proportion with the output from the control signal forming circuit 50, and the phototransistor 14, FIG. 3, of the pulse generator circuit 13 will conduct to an extent determined by the light intensity.

For example, if the supply voltage for the primary load 30 exceeds the desired magnitude, the resistance of the phototransistor 14 will drop correspondingly. Then the pulse generator circuit 13 will produce pulses of reduced durations, as has been set forth with reference to FIGS. 3 and 4. Regulated supply voltages will thus be obtained from the output terminals 27 and 54.

The transformer secondary 8 will develop a sufficiently high voltage for powering the primary load 30, causing the 112 volts supply voltage to appear between the output terminals 27 and 28, when the power switch 29 is closed by the remote control receiver circuit 34. The diode 24 of the rectifying and smoothing circuit 26 is conductive during the nonconducting periods of the switching transistor 7, so that a regulated voltage is impressed from the capacitor 25 to the transformer secondary 8. As a result, the transformer quaternary 10 develops a voltage having a magnitude determined by the ratio of the numbers of turns of the transformer secondary 8 and quaternary 10. Therefore, when the output voltage of the rectifying and smoothing circuit 26, or of the capacitor 25, is high, the comparator 16, FIG. 1, goes high to indicate the high output voltage.

Since the output line 16a of the comparator 16 is coupled to the base of the transistor $Q_{10}$, FIG. 3, of the pulse generator circuit 13, this transistor is conductive when the primary load 30 is being powered. With the resistor $R_4$ thus connected in parallel with the capacitor $C_1$, the frequency of the sawtooth or triangular wave shown in FIG. 4 will become higher. The pulse generator circuit 13 will then produce pulses at a high recurrence rate of 40 to 100 kHz. The switching of the transistor 7 at such high frequencies will lead to somewhat greater switching losses. This disadvantage, however, is more than amply offset by the reduction of power losses at the transformer 5, which can therefore be made less in size than heretofore.

When the power switch 29 is opened, the primary load state signal on the remote control receiver circuit terminal 42 will go low to indicate that the primary load 30 is not powered. Thereupon the transistors 39 and 40 will both become conductive. The conduction of the transistor 40 will result in the grounding of the cathode of the LED 12 via the diode 53, so that the LED will emit light of more or less full intensity substantially independently of the transistor 48 of the control signal forming circuit 50, thereby intercepting the feedback control of the transformer output voltages. Then the phototransistor 14 will also become substantially fully conductive.

Thus, as indicated in FIG. 4(C), the durations of the output pulses of the pulse generator circuit 13 will become shorter, as from $t_3$ to $t_4$. The output voltage of the rectifying and smoothing circuit 26, FIG. 2, will then drop to one fifth of that (e.g. 60 volts) when the primary load 30 is being powered, reducing hazard to humans when the TV set is out of operation.

It might be contemplated to connect an on-off switch to the transformer secondary terminal 23a, and to open the switch when the primary load 30 is not powered, in order to prevent the application of 112 volts between the output terminals 27 and 28. This alternative is undesirable because such a switch is very expensive.

As the output voltage of the rectifying and smoothing circuit 26, connected between the opposite extremity terminals 23a and 23c of the transformer secondary 8, drops as above when the primary load 30 is switched off, so does the output voltage of the second rectifying and smoothing circuit 33 connected between the opposite extremity terminals of the transformer tertiary 9. However, in this case, the third rectifying and smoothing circuit 37, connected between the transformer secondary terminals 23b and 23c, becomes coupled to the remote control receiver circuit 34 via the transistor 39. The receiver circuit 34 can thus be held powered pending the reclosure of the power switch 29.

Also, when the primary load 30 is switched off, the potential of the capacitor 25, FIG. 2, will drop, and so will the voltage of the transformer quaternary 10. Then the comparator 16, FIG. 1, will go low to indicate that the primary load is not powered, resulting in the nonconduction of the transistor $Q_{10}$, FIG. 3, of the pulse generator circuit 13. Thereupon the frequency of the sawtooth voltage $V_2$ to the negative input of the comparator 55 will drop to, say, 18 kHz, as after time $t_3$ in FIG. 4(A). With the repetition rate of the duration modulated pulses thus reduced, the switching transistor 7 will cause less loss than heretofore when the primary load 30 is not powered.

As an additional advantage, the reduction of the switching frequency when the primary load 30 is not powered makes possible the production of stable duration modulated pulses for providing the desired 12 volts supply voltage from the transformer secondary division $8_b$ for powering the remote control receiver circuit 34. More specifically, if the desired low supply voltage were to be obtained with the same high switching frequency (short period $T_1$) as when the primary load is being powered (shown in the left hand half of FIG. 4), then the durations Ton of the FIG. 4(C) pulses would have to be inconveniently short. In the illustrated embodiment, however, the low supply voltage is obtained with the lower switching frequency (longer period $T_2$), as indicated at the right hand half of FIG. 4. The lower switching frequency is realized by increasing the interpulse spaces Toff rather than by decreasing the pulse durations Ton, so that stable pulses can be produced for positively driving the secondary load.

Even though the switching frequency is reduced as above when the primary load is not powered, the currents flowing through the transformer primary 6 and secondary 8 are much less in magnitude than when the primary load is being powered. No significant temperature rise or other problem is therefore to occur if the transformer is desired for operation at high switching frequencies.

Figure 5:
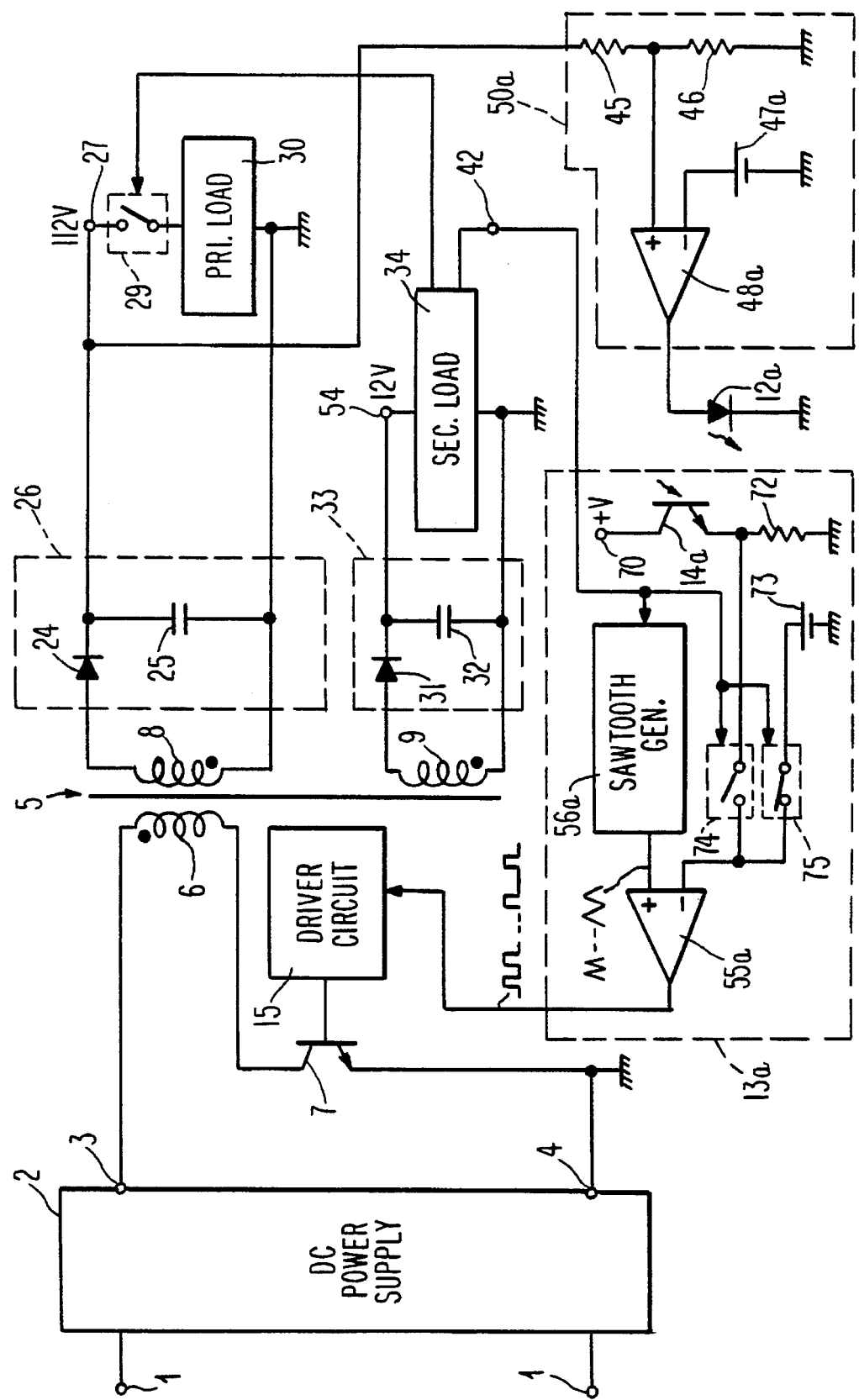
FIG. 5 is a diagram similar to FIG. 1 but showing an alternate embodiment of the invention.

FIG. 5 shows an alternate power supply system according to the invention. The alternate system differs from that of FIGS. 1–3 in that the former has no rectifying and smoothing circuit 37, transistors 39, 40 and 41, Zener diode 44, diode 53, resistors 43, 51 and 52, and comparator 16 of the latter, and includes a modified duration modulated pulse generator circuit 13a and a modified voltage control signal forming circuit 50a.

The voltage control signal forming circuit 50a includes a differential amplifier 48a having one input coupled to the voltage dividing point between the serial connection of resistors 45 and 46, and another input to a reference voltage source 47a. The output of the differential amplifier 48a is coupled to an LED 12a and thence to the ground.

The duration modulated pulse generator circuit 13a includes a phototransistor 14a which is optically coupled to the LED 12a and which is electrically connected between a direct current supply terminal 70 and the ground via a resistor 72. The voltage dividing point between phototransistor 14a and resistor 72 is coupled via a first switch 74 to the negative input of a comparator 55a, to which is also coupled a reference voltage source 73 via a second switch 75. The positive input of the comparator 55a is coupled to a sawtooth generator circuit 56a and thence to the primary load state signal terminal 42 of the remote control receiver circuit 34. The switches 74 and 75 also have their control inputs coupled to the primary load state signal terminal 42.

The first switch 74 is closed when the primary load state signal is high, indicating that the primary load 34 is being powered, whereas the second switch 75 is closed when the primary load state signal is low. The reference voltage from the source 73 is so determined that the 12 volts supply voltage is obtained from the output terminal 54 when the primary load is not being powered. The sawtooth generator circuit 56a puts out a sawtooth wave at a relatively high frequency when the primary load is being powered, and at a lower frequency when it is not. The comparator 55a puts out duration modulated pulses for on-off control of the switching transistor 7 by comparing the sawtooth wave to its positive input and the voltage to its negative input.

Thus, in this alternate embodiment, too, the transistor 7 is turned on and off at a lower frequency when the primary load is not powered than when it is. Less switching loss is therefore to occur than heretofore.

Notwithstanding the foregoing detailed disclosure, it is not desired that the invention be limited by the exact details of such disclosure. For instance, the transistor $Q_{10}$ to could be controlled by the primary load state signal from the terminal 42, instead of by the output from the comparator 16. A variety of other modifications, alterations and adaptations of the invention will readily suggest themselves to conform to design preferences or to the specific requirements of each application of the invention, without departing from the scope of the invention as expressed in the claims which follow.

What is claimed is:

1. A switching power supply system for a primary and a secondary load, the primary load being greater in power requirement than the secondary load, comprising:

(a) a direct current power supply;

(b) a transformer having a primary winding connected across the direct current power supply;

(c) a switching element connected in series with the primary winding of the transformer;

(d) secondary winding means of the transformer electromagnetically coupled to the primary winding thereof, the secondary winding means having first output means for providing a first supply voltage, and second output means for providing a second supply voltage, the first supply voltage being greater than the second supply voltage;

(e) a first rectifying and smoothing circuit connected to the first output means of the secondary winding means of the transformer, the primary load being to be connected to the first rectifying and smoothing circuit;

(f) a second rectifying and smoothing circuit connected to the second output means of the secondary winding means of the transformer, the secondary load being to be connected to the second rectifying and smoothing circuit;

(g) load state signal means for providing a load state signal indicative of whether the primary load is being powered or unpowered while the secondary load is held powered; and (h) pulse generator means connected between the switching element and the load state signal means for generating a train of pulses at a first periodic rate for opening and closing the switching element when the primary load is being powered, and at a second periodic rate, less than the first periodic rate, for opening and closing the switching element when the primary load is not being powered;

(i) whereby, when the primary load is not being powered, the secondary load can be powered with less switching loss than if the switching element is opened and closed with the same frequency as when the primary load is being powered.

2. The switching power supply system of claim 1 wherein the pulse generator means comprises:

(a) a sawtooth generator circuit connected to the load state signal means for generating a sawtooth wave at the first periodic rate when the primary load is being powered, and at the second periodic rate when the primary load is not being powered;

(b) reference signal means for providing a reference signal; and (c) a comparator having two inputs each connected to the sawtooth generator circuit and to the reference signal means, respectively, and an output connected to the switching element, for supplying the train of pulses at the first or the second periodic rate to the switching element by comparing the sawtooth wave and the reference signal.

3. The switching power supply system of claim 2 wherein the pulse generator means further comprises voltage adjustment means connected to the reference signal means for varying the voltage of the reference signal.

4. The switching power supply system of claim 3 further comprising:

(a) voltage control signal forming means coupled between the first rectifying and smoothing circuit and the voltage adjustment means of the pulse generator means for delivering to the voltage adjustment means a voltage control signal for holding constant an output voltage of the first rectifying and smoothing circuit; and (b) means coupled to the voltage control signal means and the load state signal means and the pulse generator means for permitting the delivery of the voltage control signal to the voltage adjustment means when the load state signal indicates that the primary load is being powered, and for delivering to the voltage adjustment means a constant signal for holding constant the durations of the output pulses of the pulse generator means when the load state signal indicates that the primary load is not being powered.

5. The switching power supply system of claim 2 wherein the reference signal means of the pulse generator means comprises:

(a) first circuit means for generating a first reference signal, the first circuit means including voltage adjustment means for varying the voltage of the first reference signal;

(b) second circuit means for generating a second reference signal of constant voltage;

(c) a first switch connected between the first circuit means and the comparator and being responsive to the load state signal for supplying the first reference signal to the comparator when the primary load is being powered; and (d) a second switch connected between the second circuit means and the comparator and being responsive to the load state signal for supplying the second reference signal to the comparator when the primary load is not being powered.

6. The switching power supply system of claim 5 further comprising voltage control signal forming means coupled between the first rectifying and smoothing circuit and the voltage adjustment means of the first circuit means of the reference signal means of the pulse generator means for delivering to the voltage adjustment means a voltage control signal for holding constant an output voltage of the first rectifying and smoothing circuit.

7. The switching power supply system of claim 1 wherein the secondary winding means of the transformer comprises a secondary winding having a ground terminal, a first terminal for providing the first supply voltage between itself and the ground terminal, and a second terminal for providing the second supply voltage between itself and the ground terminal.

8. The switching power supply system of claim 1 wherein the secondary winding means of the transformer comprises:

(a) a secondary winding for providing the first supply voltage; and (b) a tertiary winding for providing the second supply voltage.

9. A switching power supply system for a primary and a secondary load, the primary load being greater in power requirement than the secondary load, comprising:

(a) a direct current power supply;

(b) a transformer having a primary winding, a tapped secondary winding, and a tertiary winding, the primary winding being connected across the direct current power supply, the tertiary winding being less in the number of turns than the tapped secondary winding;

(c) a switching element connected in series with the primary winding of the transformer;

(d) a first rectifying and smoothing circuit connected between a pair of opposite extremities of the secondary winding of the transformer, the primary load being to be connected to the first rectifying and smoothing circuit;

(e) a second rectifying and smoothing circuit connected between a pair of opposite extremities of the tertiary winding of the transformer, the secondary load being to be connected to the second rectifying and smoothing circuit;

(f) a third rectifying and smoothing circuit connected between a tap and one extremity of the secondary winding of the transformer;

(g) load state signal means for providing a load state signal indicative of whether the primary load is being powered or unpowered while the secondary load is held powered;

(h) switch means to be connected between the third rectifying and smoothing circuit and the secondary load, the switch means being responsive to the load state signal for connecting the third rectifying and smoothing circuit to the secondary load when the primary load is not being powered; and (i) pulse generator means connected between the switching element and the load state signal means for generating a train of pulses at a first periodic rate for opening and closing the switching element when the primary load is being powered, and at a second periodic rate, less than the first periodic rate, for opening and closing the switching element when the primary load is not being powered;

(j) whereby, when the primary load is not being powered, the secondary load can be powered with less switching loss than if the switching element is opened and closed with the same frequency as when the primary load is being powered.

10. The switching power supply system of claim 9 wherein the pulse generator means comprises:

(a) a sawtooth generator circuit connected to the load state signal means for generating a sawtooth wave at the first periodic rate when the primary load is being powered, and at the second periodic rate when the primary load is not being powered;

(b) reference signal means for providing a reference signal; and (c) a comparator having two inputs each connected to the sawtooth generator circuit and to the reference signal means, respectively, and an output connected to the switching element, for supplying the train of pulses at the first or the second periodic rate to the switching element by comparing the sawtooth wave and the reference signal.

11. The switching power supply system of claim 10 wherein the pulse generator means further comprises a phototransistor for varying the voltage of the reference signal, and wherein the power supply system further comprises:

(a) a voltage control signal forming circuit to the first rectifying and smoothing circuit for forming a voltage control signal for holding constant an output voltage of the first rectifying and smoothing circuit;

(b) a light emitting diode connected between the second rectifying and smoothing circuit and the voltage control signal forming circuit and optically coupled to the phototransistor of the pulse generator means, the light emitting diode emitting light with intensity depending upon the magnitude of the voltage control signal when the primary load is being powered; and (c) second switch means connected between the voltage control signal forming circuit and ground and responsive to the load state signal for preventing the light emitting diode to be driven by the voltage control signal when the primary load is not being powered, in order to cause the light emitting diode to emit light of constant, greater intensity than when the primary load is being powered.

* * * * *